Sept. 19, 1933.  N. W. SCHIRESON  1,927,575
STRINGED INSTRUMENT
Filed Sept. 21, 1932   2 Sheets-Sheet 1
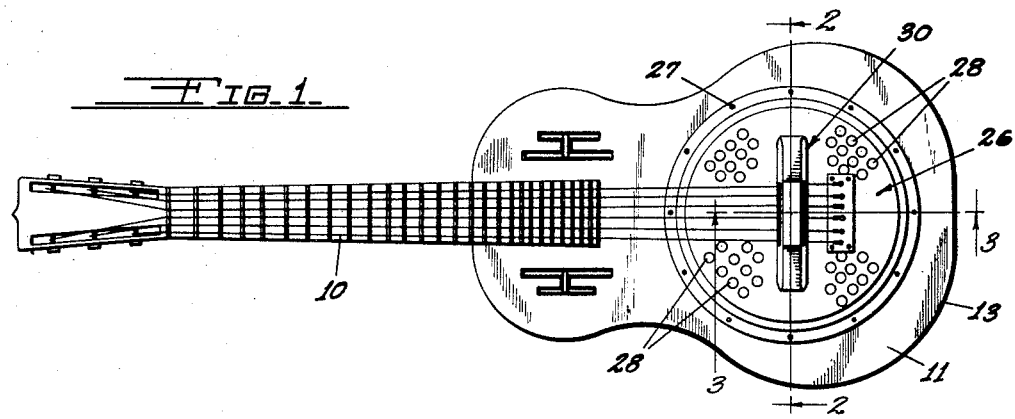
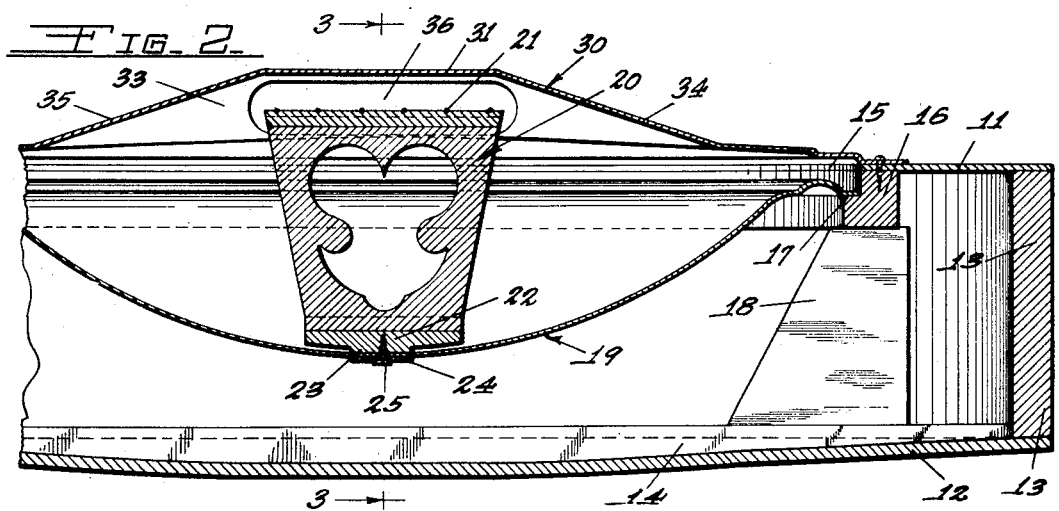
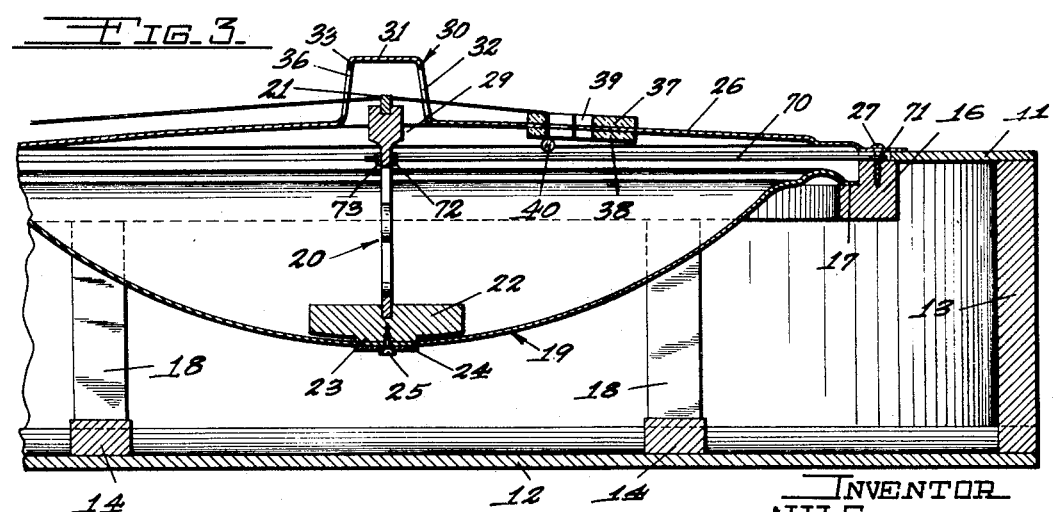
INVENTOR
N. W. SCHIRESON
By Hazard and Miller
ATTORNEYS

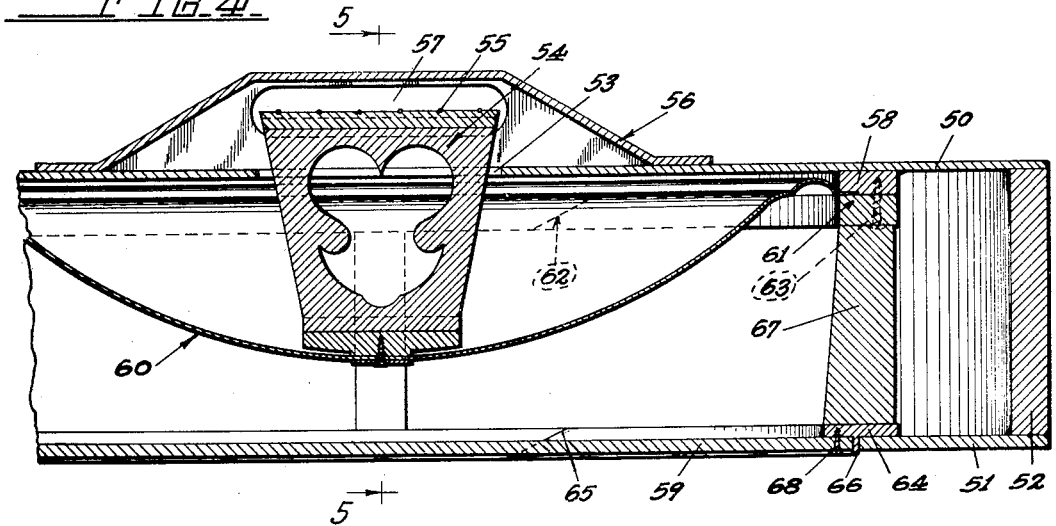
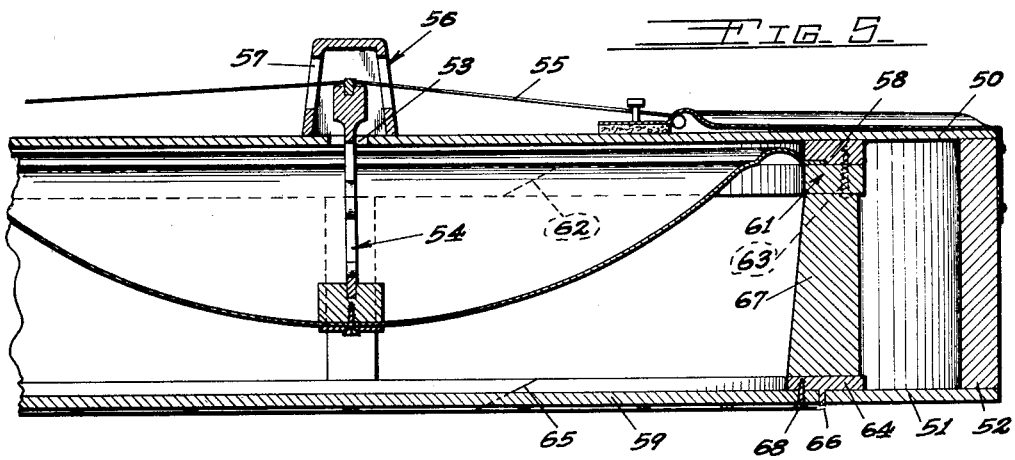
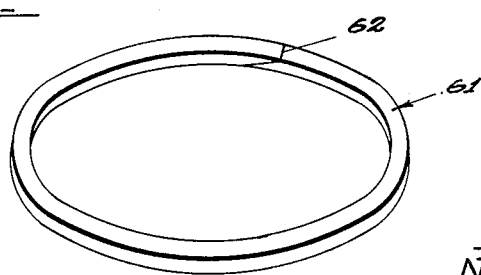

Patented Sept. 19, 1933

1,927,575

UNITED STATES PATENT OFFICE 1,927,575

STRINGED INSTRUMENT

Nathan W. Schireson, Los Angeles, Calif., assignor to Schireson Bros., Los Angeles, Calif., a copartnership composed of Nathan W. Schireson and Jacob Schireson Application September 21, 1932
Serial No. 634,186

26 Claims. (Cl. 84—296)

This invention relates to improvements in stringed instruments and may be considered as an improvement over the construction disclosed in my pending application entitled Stringed instrument, Serial No. 571,781, filed October 29, 1931 and having since matured into Patent No. 1,887,861, granted November 15, 1932.

An object of the present invention is to provide an improved stringed instrument embodying a novel amplifying construction for amplifying the sound produced by the vibrating strings. In my prior application, above referred to, there is a thin sheet metal diaphragm supported within the body of the instrument constituting a type of resonator. This diaphragm is supported at its edges within the body and a wooden diaphragm supporting the bridge and the strings of the instrument is supported at its edges adjacent the edges of the sheet metal diaphragm or resonator. In such a construction a certain thickness of sheet metal had to be preserved inasmuch as at the point of bearing of the wooden diaphragm the metal was subject to bending stresses.

It is an object of the present invention to provide a stringed instrument employing a sheet metal diaphragm or resonator and to provide a novel arrangement for supporting the bridge on the diaphragm at about the center of the diaphragm so as to transmit the vibrations from the strings to the diaphragm and subject the diaphragm to tension stresses rather than bending stresses. In this way it is possible for me to employ a thinner metal which is more highly sensitive and which is capable of being influenced to a greater extent by the vibrations of the strings.

In its preferred embodiment the preferred stringed instrument has a top wall in which there is an opening providing for the insertion of the diaphragm. This is normally covered by a sheet metal cover plate. In some instances the presence of the sheet metal cover plate is thought to be undesirable.

Another object of the invention is to provide a stringed instrument construction wherein the top wall of the instrument may be provided entirely or formed of wood to overcome this objection, the diaphragm being inserted into the body of the instrument through the bottom or back wall.

In this connection an object of the invention is to provide a construction which will present a neat and attractive appearance on the exterior of the bottom or back wall.

A further object of the invention is to provide a novel construction for inserting the supporting ring or rings which support the diagram at its edge enabling the opening through which the diaphragm is inserted to be formed just large enough to receive the diaphragm and to provide a construction wherein the supporting rings, although larger than the opening in diameter, may be inserted therethrough.

A further object of the invention is to provide a novel bracing construction for bracing the supporting rings for the diaphragm.

Another object of the invention is to provide a novel guard for protecting the bridge.

With the foregoing and other objects in view, which will be made manifest in the following detailed description, and specifically pointed out in the appended claims, reference is had to the accompanying drawings for an illustrative embodiment of the invention, wherein:

Fig. 1 is a top plan view illustrating the preferred embodiment of the improved stringed instrument.

Fig. 2 is a vertical section taken substantially upon the line 2—2 upon Figure 1.

Fig. 3 is a vertical section taken substantially upon the lines 3—3 upon Figures 1 and 2.

Fig. 4 is a view similar to Figure 2 illustrating a modified form of construction embodying the invention.

Fig. 5 is a vertical section taken upon the line 5—5 upon Figure 4.

Fig. 6 is a perspective view of a supporting ring for the diaphragm.

Referring to the accompanying drawings, wherein similar reference characters designate similar parts throughout, the invention is illustrated as having been applied or embodied in a guitar although it is equally applicable to other similar instruments. The guitar is shown as having a fret board 10 and a body having a top wall 11, a bottom wall 12, and side walls 13. The bottom wall 12, as is conventional in this type of instrument, bulges downwardly slightly, that is it is downwardly convex, and in the preferred form of construction there are a plurality of transverse braces 14 which present downwardly convex surfaces for bracing and maintaining the bottom wall 12 in this condition. In the top wall 11 there is formed a large opening 15 which, in the event that the diaphragm used is circular in plan, will be of circular shape. If the diaphragm should be given a different shape, the opening 15 is made to correspond thereto. On the under side of the top wall and surrounding the opening there is a ring 16 providing a shoulder 17. Blocks 18, which have their top and bottom surfaces slightly tapered, are inserted through opening 15 and positioned on top of braces 14. They are forced outwardly, thus wedging between the supporting ring 16 and the braces to effectively brace and hold the supporting ring 16 in position. The diaphragm 19 is formed of sheet metal and is concavo-convex in form, the particular diaphragm shown being hemispherical in shape. The concave side is disposed upwardly and the edges of the diaphragm are supported on shoulder 17. A bridge 20 is provided which supports the strings indicated at 21. This bridge is supported on a block 22 resting on the diaphragm at about its center, or at about its lowermost point. The sides of block 22 may be cut away to leave only the center portion, indicated at 23, in actual engagement with the diaphragm. On the under side of the diaphragm there is provided a thin washer 24 of the size and shape of portion 23 and a screw 25 extends through the washer, through the diaphragm, and into the block 22. While the pressure of the strings 21 on the bridge will maintain the bridge in position on the diaphragm, this screw is preferably employed to hold the bridge and diaphragm assembled while changing strings and while the construction is being assembled. A metallic cover plate 26 covers the opening 15 and is fastened in place as by screws 27. This cover plate preferably has suitable perforations 28 and is provided with an opening at 29 to receive the top of the upwardly extending bridge 20. A guard, generally designated at 30, is provided on the cover plate 26 and this guard may be either integral with the cover plate or attached thereto. It covers the opening 29 in the top of the bridge and provides a top 31, sides 32 and 33, and slanting ends 34 and 35. Elongated horizontal apertures 36 are formed in the sides 32 and 33 and the strings 21 extend therethrough. The ends of the strings may be fastened to a tail piece as shown in Figure 5 or strips of bakelite, hard rubber, or the equivalent, indicated at 37 and 38, may be riveted to the top and bottom of the cover plate. Keyhole slots or apertures 39 may be formed therethrough for the reception of the bead 40 conventionally attached to the ends of the strings. Instead of keyhole slots, merely round openings with suitable pegs, which is one conventional practice, may be formed in the strips 37 and 38 and the cover plate. In this construction, as above described, it will be noted that the bridge is supported at about the center of the concavo-convex diaphragm. The vibrations of the strings when struck are transmitted through the bridge to the diaphragm which not only amplifies the sound but also because of its shape tends to throw the sound out of the instrument. Having the bridge supported at the center of the diaphragm, the metal of the diaphragm is largely subjected to tension stresses between portion 23 and the edge of the diaphragm and inasmuch as the bending moments are largely reduced and tension taking place to support the bridge, it is possible to use a very thin metal for the diaphragm which is free to be influenced readily by the vibrations transmitted by the bridge.

Some musicians are reluctant to employ an instrument having a metallic cover plate, believing that this interferes with the obtaining of a clear melodious tone. To overcome this objection there is provided a construction as disclosed in Figures 4 and 5. In this construction the body has a top wall 50, a bottom or back 51, and side walls 52. Top wall 50 is formed entirely of wood and has a small opening 53 which is just large enough to accommodate the bridge 54 supporting the strings 55. Over this opening there is secured a suitable guard 56 having a passage therethrough indicated at 57 for the strings. In constructing this type of instrument the conventional practice is to completely form the body first and install the diaphragm or resonator afterwards. During the construction a ring 58 may be glued or otherwise attached to the under side of the top wall 50 or it may be subsequently installed as will be hereinafter described. When the body has been completed a large opening conforming to the size and shape of the diaphragm is cut in the back or bottom wall 51 and the material indicated at 59 removed from the back wall is preserved or saved to form a closure. When this opening is thus formed the diaphragm 60 with its bridge 54 attached is bodily inserted through the opening. A supporting ring 61 is provided having a diagonal split at 62. This ring in normal condition is larger than the diameter of the opening and larger than the diameter of the diaphragm so that it is capable of supporting the diaphragm. To insert this ring through the smaller opening, the ends are spaced vertically from each other by flexing the ring and thus deforming the ring from the shape shown into a helix. On positioning one end of the ring through the opening and rotating the ring, it can be fed through the opening and allowed thereafter to return into the position shown. This enables the larger ring to be inserted through the small opening and to use a single piece ring, which is advantageous over inserting a ring in segments. When the ring is inserted about the diaphragm, it is fastened in place to ring 58 by screws 63 so as to effectively clamp the edges of the diaphragm between rings 58 and 61. If ring 58 has not been fastened or installed in the body during the manufacture of the body, this ring may have a similar split to split 62 and may be introduced into the body through the opening previous to the insertion of the diaphragm in the same manner. In cutting out the portion 59 of the back wall or bottom wall 51, the thickness of the cutting instrument is lost. In other words if the section 59 has been sawed out, material equal to the thickness of the saw is lost between the edges of closure 59 and the adjacent wall 51. A ring 64, which is of T shaped section, is provided having a diagonal split 65. This is inserted through the opening by deforming the ring into a helix and screwing it through the opening while in this helical condition and after it has been inserted it is glued or otherwise fastened to the upper surface of the bottom or back wall 51. The web of this ring indicated at 66 fills the space sawed out of the back wall and may or may not project slightly beyond the bottom surface of wall 51 forming a slight projecting bead. Brace blocks 67 are then inserted, these having slightly tapered top and bottom edges, which may have glue applied thereto and on being forced home will effectively brace ring 61 on the bottom or back wall 51. The sections 59 of the material, which has been carefully preserved, can then be applied to the seat of seating ring 64 and fastened in place by screws 68. This section of the back wall, having been carefully preserved and reapplied, can have its grain lined up with the grain of the remainder of the back wall 51, presenting the same attractive appearance that the instrument originally had with the addition of the screw heads of screws 68 and the slight bead at 66, which may be regarded as of an ornamental character. In this type of instrument it will be appreciated that the diaphragm is supported in substantially the same manner and supports the bridge in substantially the same manner as that previously described in connection with Figures 1, 2 and 3. The construction is such as to enable a very thin metal to be used, the metal being placed largely under tension by having the bridge supported at the center or low point.

In some instances owners of conventional guitars and similar instruments may wish to install an amplifying unit without cutting the back. It will, of course, be appreciated that if these owners object to the provision of a metallic cover plate, that insertion of the unit through the back may be required. However, in modifying a conventional guitar so as to employ an amplifying unit and having no objection to a metallic cover plate, a large circular hole corresponding to hole 15 may be cut in the top wall. A ring similar in cross section to ring 16 may be provided and this ring may have a diagonal split corresponding to split 62. The ring can then be deformed into a helix, inserted through the smaller opening 15, and then allowed to return to its normal position, expanding beneath the top wall around the opening. It can then be glued in place and brace blocks inserted. The diaphragm and bridge can then be positioned in the unit and the cover plate installed.

In some instances it is necessary to brace the bridge so as to hold it firmly in proper position with respect to the fret board 10. To this end the small slender wire like rod 70 may be provided having an eye at one end which is recessed in the body of the instrument beneath the rear edge of the cover plate, as shown. One of the screws on the cover plate may pass through the eye 71 and thus anchor this rod at this point. The other end of the rod may extend through the bridge and be provided with jamb nuts 72 and 73. These when adjusted and tightened will firmly hold the bridge in the desired position with respect to the fret board, preventing its being disturbed in any way, such as by the occasion of changing strings.

From the above described constructions it will be appreciated that a novel, simple and advantageous amplifying unit for guitars and similar instruments has been provided and that a novel arrangement for bracing the support for the amplifying unit is also disclosed. Provision is made for insertng these units through the front or top wall of the guitar as it is being constructed or for introducing the units into the body of the instrument through either wall in cases where the instrument has already been constructed. In so introducing the units a single piece supporting ring may be used which is highly advantageous over installing the supporting ring in segments.

Various changes may be made in the details of construction without departing from the spirit or scope of the invention as defined by the appended claims.

I claim:

1. In a stringed instrument, a body, a concavo-convex diaphragm supported at its periphery in the body with the concave side disposed upwardly, and a bridge supporting the strings of the instrument supported at about the center of the diaphragm.

2. In a stringed instrument, a body, a concavo-convex diaphragm supported at its periphery in the body with the concave side disposed upwardly, and a bridge supporting the strings of the instrument supported at the lowest point on the diaphragm.

3. In a stringed instrument, a body having a top and a bottom, a ring secured to the under side of the top, a diaphragm supported at its periphery on the ring, means supporting the strings of the instrument on the diaphragm, and blocks between the ring and bottom bracing the ring in position.

4. In a stringed instrument, a body having a top and a bottom, a ring secured to the under side of the top, a diaphragm supported at its periphery on the ring, means supporting the strings of the instrument on the diaphragm, braces extending across the bottom of the instrument, and blocks between the ring and braces bracing the ring in position.

5. In a stringed instrument, a cover plate and a guard, the guard having a top, sides and ends; there being apertures in the sides of the guard for the strings of the instrument to extend through.

6. An amplifying appliance for stringed instruments comprising a concavo-convex sheet metal diaphragm, and a bridge secured to the concave side of the diaphragm.

7. An amplifying appliance for stringed instruments comprising a concavo-convex sheet metal diaphragm, and a bridge secured to the concave side of the diaphragm at about the center.

8. In a stringed instrument, a body, a diaphragm in the body, a bridge on the diaphragm, there being an opening in the top of the body through which the top of the bridge extends, and a guard having a top, sides and slanting ends disposed over the bridge and opening, there being apertures in the sides for the strings of the instrument resting on the bridge to extend through.

9. In a stringed instrument, a body having a normally closed opening in one of its walls, a diaphragm supported in the instrument, the opening being sufficiently large to enable the passage of the diaphragm therethrough, and a split ring of greater diameter than the opening insertable therethrough and secured to the body serving to support the diaphragm at its edges.

10. In a stringed instrument, a body having a normally closed opening in one of its walls, a diaphragm supported in the instrument, the opening being sufficiently large to enable the passage of the diaphragm therethrough, and a pair of split rings of greater diameter than the opening insertable through the opening and secured to the body and serving to clamp the edge of the diaphragm therebetween.

11. In a stringed instrument, a body having a normally closed opening in its bottom, and a diaphragm supported in the instrument, the opening being sufficently large to enable the passage of the diaphragm therethrough.

12. In a stringed instrument, a body having a normally closed opening in its bottom, a diaphragm supported in the instrument, the opening being sufficiently large to enable the passage of the diaphragm therethrough, and a ring insertable through the opening secured to the body and serving to support the diaphragm at its edges.

13. In a stringed instrument, a body having a normally closed opening in its bottom, a diaphragm supported in the instrument, the opening being sufficiently large to enable the passage of the diaphragm therethrough, and a split ring of greater diameter than the opening insertable therethrough and secured to the body serving to support the diaphragm at its edges.

14. In a stringed instrument, a body having a normally closed opening in its bottom, a diaphragm supported in the instrument, the opening being sufficiently large to enable the passage of the diaphragm therethrough, and a pair of split rings of greater diameter than the opening insertable through the opening and secured to the body and serving to clamp the edges of the diaphragm therebetween.

15. In a stringed instrument, a body having an opening in one of its walls, a diaphragm in the instrument insertable therethrough, a closure for the opening, and means providing a seat for the closure, said means extending between the edge of the closure and the edge of the adjacent body wall structure.

16. In a stringed instrument, a concavo-convex diaphragm supported adjacent its edges, a bridge for supporting the strings of the instrument, said bridge having its sole point of engagement with the diaphragm against the concave side of the diaphragm at about the center thereof.

17. In a stringed instrument, a concavo-convex diaphragm supported adjacent its edges, a bridge for supporting the strings of the instrument, said bridge having its sole point of engagement with the diaphragm against the concave side of the diaphragm at about the center thereof, and fastening means extending through the diaphragm into the bottom of the bridge.

18. In a stringed instrument, a concavo-convex diaphragm supported adjacent its edges, a bridge for supporting the strings of the instrument, said bridge having a single point of engagement with the diaphragm located at about the center thereof.

19. In a stringed instrument, a concavo-convex diaphragm supported adjacent its edges, a bridge for supporting the strings of the instrument, said bridge having a single point of engagement with the diaphragm located at about the center thereof, and fastening means extending through the diaphragm into the bottom of the bridge.

20. In a stringed instrument, a body having a top and bottom, there being an opening in one of the walls of the body to enable a diaphragm to be inserted, a split ring of greater diameter than the opening insertable therethrough, a diaphragm having its edges supported upon said split ring, and means for supporting the strings of the instrument on the diaphragm.

21. In a stringed instrument, a body having a top and bottom, there being an opening in one of the walls of the body to enable a diaphragm to be inserted, a split ring of greater diameter than the opening insertable therethrough, a diaphragm having its edges supported upon said split ring, means for supporting the strings of the instrument on the diaphragm, and means normally closing said opening.

22. In a stringed instrument, a body having a top and bottom, there being an opening in one of the walls of the body to enable a diaphragm to be inserted, a split ring of greater diameter than the opening insertable therethrough, a diaphragm having its edges supported upon said split ring, means for supporting the strings of the instrument on the diaphragm, and braces between said split ring and the opposite wall of the body bracing the ring against its wall of the body.

23. In a stringed instrument, a body having an opening in its top, a cover plate covering the opening, a bridge for the strings of the instrument, the ends of the strings being anchored to the cover plate adjacent the bridge.

24. A stringed instrument comprising a body, there being an opening in the top wall of the body, a split ring against the under side of the top wall insertable through said opening, a diaphragm supported upon said ring, a bridge supporting strings of the instrument upon said diaphragm, a cover plate over the opening, and fastening means extending through the cover plate, top wall and into the ring.

25. In a stringed instrument, a concavo-convex diaphragm supported adjacent its edges, a bridge for supporting the strings of the instrument, said bridge resting on the diaphragm, and a brace connecting the bridge to the body of the instrument.

26. In a stringed instrument a body, a concavo-convex diaphragm supported adjacent its edges and disposed within the body, a bridge for supporting the strings of the instrument, said bridge having a single point of engagement with the diaphragm located at about the center of the diaphragm and disposed against the concave side thereof, and a brace connecting the upper portion of the bridge to the body.

NATHAN W. SCHIRESON.